United States Patent
Weigl et al.

(10) Patent No.: US 8,720,980 B2
(45) Date of Patent: May 13, 2014

(54) VEHICLE BODY STRUCTURE IN THE FLOOR REGION OF THE OCCUPANT COMPARTMENT AND ASSOCIATED MANUFACTURING METHOD

(75) Inventors: Willibald Weigl, Zandt (DE); Hans-Peter Maier, Wolnzach (DE); Martin Schromm, Gaimersheim (DE); Tobias Urban, Besigheim-Ottmarsheim (DE)

(73) Assignee: Audi AG, Ingolstadt (DE)

( * ) Notice: Subject to any disclaimer, the term of this patent is extended or adjusted under 35 U.S.C. 154(b) by 3 days.

(21) Appl. No.: 13/496,166

(22) PCT Filed: Sep. 17, 2010

(86) PCT No.: PCT/EP2010/005716
§ 371 (c)(1),
(2), (4) Date: May 25, 2012

(87) PCT Pub. No.: WO2011/032715
PCT Pub. Date: Mar. 24, 2011

(65) Prior Publication Data
US 2012/0267917 A1 Oct. 25, 2012

(30) Foreign Application Priority Data
Sep. 18, 2009 (DE) .......................... 10 2009 042 187

(51) Int. Cl.
*B62D 25/20* (2006.01)
(52) U.S. Cl.
USPC .................................................... 296/193.07
(58) Field of Classification Search
CPC ................................ B62D 21/02; B62D 25/20

USPC ..................................... 296/204, 205, 193.07
See application file for complete search history.

(56) References Cited

U.S. PATENT DOCUMENTS

| | | | |
|---|---|---|---|
| 5,611,593 A | 3/1997 | Fukagawa et al. | |
| 6,824,200 B2* | 11/2004 | Tomita ..................... | 296/187.08 |
| 7,500,714 B2* | 3/2009 | Abe et al. ................ | 296/193.07 |
| 7,644,978 B2* | 1/2010 | Tosaka et al. ............ | 296/187.12 |
| 8,052,206 B2* | 11/2011 | Wang et al. .............. | 296/193.07 |
| 8,118,350 B2* | 2/2012 | Mendoza et al. ........ | 296/193.07 |
| 8,128,154 B2* | 3/2012 | Egawa et al. ............ | 296/187.12 |
| 8,491,048 B2* | 7/2013 | Mori ........................ | 296/193.07 |
| 2010/0264699 A1* | 10/2010 | Wang et al. .............. | 296/193.07 |

(Continued)

FOREIGN PATENT DOCUMENTS

| | | |
|---|---|---|
| DE | 44 14 472 A1 | 11/1995 |
| DE | 197 20 109 A1 | 11/1997 |

(Continued)

*Primary Examiner* — H Gutman
(74) *Attorney, Agent, or Firm* — Henry M Feiereisen LLC

(57) ABSTRACT

The invention relates to a vehicle body structure in the floor region of the occupant compartment having on both sides a respective longitudinal beam (3) in the floor region of the occupant compartment between a transmission tunnel and a side sill. According to the invention each longitudinal beam (3) extends longitudinally continuously over the entire footwell length from the front end (4) to a heel plate. The longitudinal beam (3) is here formed on the bottom side as a closed longitudinal hollow beam by virtue of a longitudinal beam stepped edge (9) of the floor panel (10AB) and on the top side as a longitudinal beam closure part (11SW) by virtue of a longitudinal beam angle section connected to the top side.

15 Claims, 2 Drawing Sheets

(56) References Cited

U.S. PATENT DOCUMENTS

| | | | |
|---|---|---|---|
| 2011/0241381 A1* | 10/2011 | Sato et al. | 296/193.02 |
| 2011/0272969 A1* | 11/2011 | Mori | 296/193.07 |
| 2012/0038187 A1* | 2/2012 | Mori | 296/193.07 |
| 2012/0119544 A1* | 5/2012 | Mildner et al. | 296/193.07 |
| 2013/0049404 A1* | 2/2013 | Uesugi | 296/203.01 |

FOREIGN PATENT DOCUMENTS

| | | |
|---|---|---|
| DE | 197 46 238 A1 | 5/1998 |
| DE | 602 01 115 T2 | 9/2005 |
| DE | 10 2007 001 721 A1 | 7/2008 |
| EP | 1 640 252 A1 | 3/2006 |

* cited by examiner

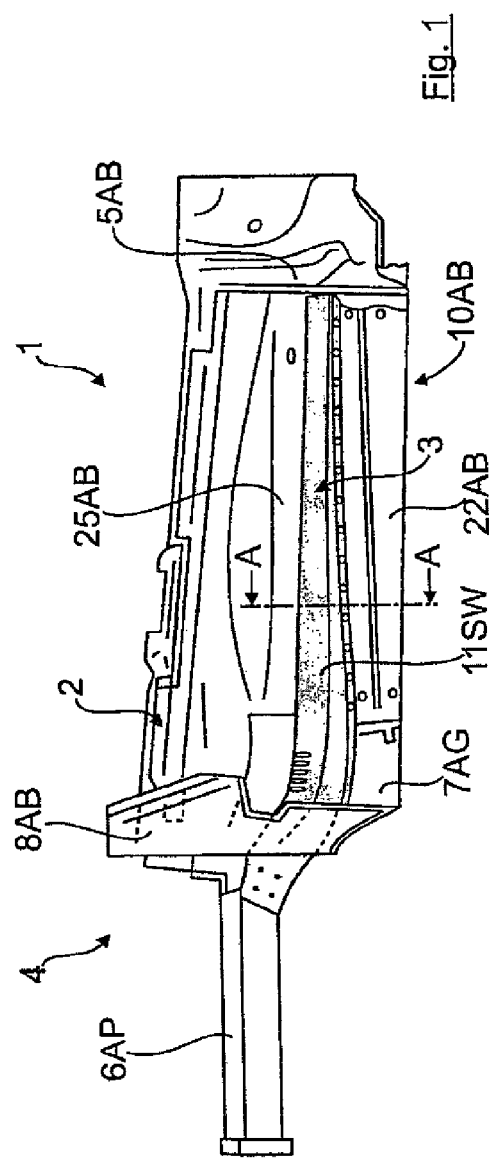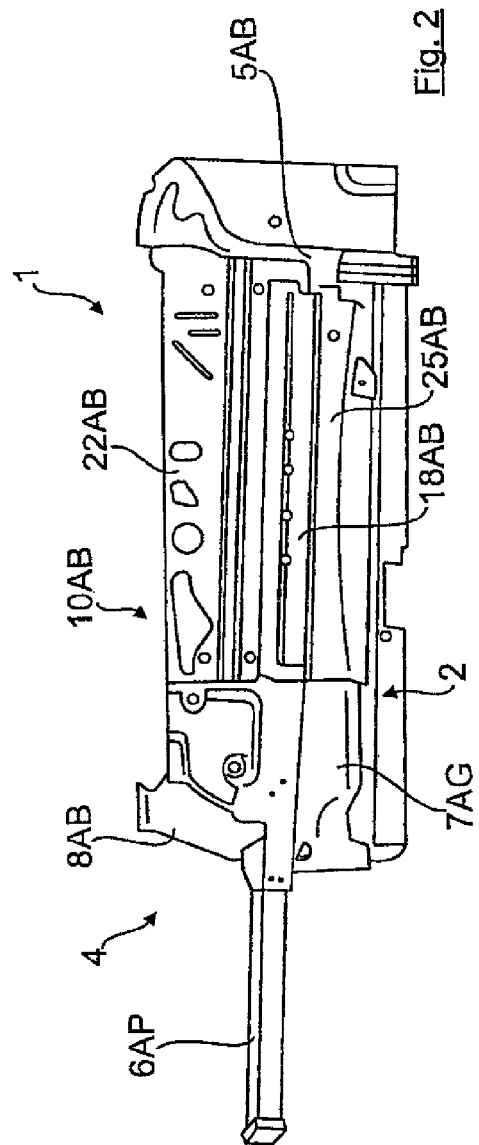

VEHICLE BODY STRUCTURE IN THE FLOOR REGION OF THE OCCUPANT COMPARTMENT AND ASSOCIATED MANUFACTURING METHOD

CROSS-REFERENCES TO RELATED APPLICATIONS

This application is the U.S. National Stage of International Application No. PCT/EP2010/005716, filed Sep. 17, 2010, which designated the United States and has been published as International Publication No. WO 2011/032715 and which claims the priority of German Patent Application, Serial No. 10 2009 042 187.4, filed Sep. 18, 2009, pursuant to 35 U.S.C. 119(a)-(d).

BACKGROUND OF THE INVENTION

The invention relates to a vehicle body structure in the floor region of the passenger compartment as well as an associated manufacturing method.

DE 44 14 472 C2 and DE 602 01 115 E2 respectively disclose a vehicle body structure in the floor region of the occupant compartment, having a longitudinal beam extending on both sides in the floor region of the occupant compartment between a transmission tunnel and a side sill in longitudinal direction of the vehicle. Concretely, the longitudinal beam is formed in that a longitudinally extending upwardly open hat profile is placed on the floor panel from below and connected at the hat borders to the floor panel by welding. Overall, the longitudinal beam thus projects downwards, resulting in a relatively strongly jagged and aerodynamically unfavorable underbody structure. Further, this represents a conventional production of steel bodies without special measures to reduce weight.

In generally known modern vehicle bodies materials made of light metals or light metal alloys, in particular aluminum, are used in addition to aerodynamic designs to reduce fuel consumption by saving weight. The stiffness and joining technology for light metal components differ from the previous conventional, exclusive steel plate construction which poses problems which have to be solved with a material mix which is precisely adjusted to the respective site of the vehicle body, and a respective combination of components as well as cost-efficient and appropriate joining techniques for a use in large series.

It is an object of the invention to refine a generic conventional vehicle body structure in the floor region of the occupant compartment by providing a weight-saving construction having the required stiffness and high crash safety as well as a joining technique appropriate for mass production.

SUMMARY OF THE INVENTION

This object is attained in that the respective longitudinal beam extends longitudinally and continuously over the entire length of the footwell from the front end of the vehicle to a heel plate. The longitudinal beam is formed as closed longitudinal hollow beam, which is formed on its bottom side by a longitudinal beam stepped edge of the floor panel and on its top side by a longitudinal beam angle section which is formed as longitudinal beam closure part and adjoins the longitudinal beam stepped edge.

For a weight-saving construction of the longitudinal beam two longitudinal beam walls are directly formed from the floor panel, and the other two longitudinal beam walls are realized through the longitudinal beam closure part. Further, the underbody surface extends from front to back relatively smoothly and thus aerodynamically.

For providing stiffness in the case of a frontal or side crash, the longitudinal beam closure part is formed as longitudinal beam steel closure part from hot-formed steel. In contrast, the floor panel can be configured as particularly weight-saving floor aluminum plate, so that the floor structure overall represents a lightweight construction solution with high stability and crash safety in the case of a frontal or side crash.

For the connection of aluminum plates and steel plates, generally elaborate welding techniques, such as laser beam welding, inert gas welding etc. are known. Here, however, a riveted joint which is cost-saving and well suited for large series production is proposed for the connection of the floor aluminum plate and the longitudinal beam steel closure part, wherein the connections are preferably formed by high strength solid punch rivets.

The longitudinal beam steel closure part can advantageously be formed by two longitudinal parts, namely a longitudinal beam side closure steel part with a first longitudinal beam sidewall and border flanges which are bent in Z-shape and a roughly level longitudinal beam top closure steel part. Since these are steel plate parts, they can be easily connected at lap joint with a border flange by welding, preferably resistance spot welding. Since this welding connection lies within the dry area, no special measures are required with regard to tightness. The two-part construction of the longitudinal beam steel closure part allows for easy adjustment of the shape of the longitudinal beam to geometric circumstances and stiffness requirements, especially an adjustment to a course of the floor or to a change of diameter in the longitudinal direction.

The floor panel can also be configured multi-piece, especially for creative freedom with a longitudinal stepped aluminum plate with the second longitudinal beam sidewall and the longitudinal beam floor wall. This longitudinal beam stepped aluminum plate forms a three-layered lap joint with its longitudinal borders, the longitudinal beams of the longitudinal beam steel closure part as well as with one respective adjoining floor-side aluminum plate and an adjoining floor center aluminum plate. On these lap joints a connection is realized by rivets, wherein the steel plate border with regard to riveting and possible corrosion should advantageously be located between the aluminum plate borders.

Preferably, these rivet joints, which in this case are located in the wet area, are realized by solid punch rivets in combination with a bonding at the respective lap joint and, optionally, by additional overmolding with sealing material. This results in a high stiffness and at the same time high degree of tightness and good protection against corrosion.

Since crash-loads in particular in the case of a front crash are especially high in the region of the longitudinal hollow beam, the cross section in this region should be relatively large and roughly square. However, the cross section height can decrease continuously in longitudinal direction of the longitudinal hollow beam, and it is sufficient for the cross section to form a flat rectangle in the rear region.

As a further optimization for a minimal use of material for a cost and weight saving construction and at the same time sufficient stiffness, the wall strength of the longitudinal beam closure part can vary along its longitudinal course according to the stiffness requirements (tailored blanks).

With regard to a manufacturing process the object of the invention is solved in that the optionally multi-piece floor panel, with an optionally two-piece longitudinal beam closure part is constructed at least partly as composite part and as pre-assembly module and used in the final assembly.

BRIEF DESCRIPTION OF THE DRAWING

The invention is further explained with reference to a drawing.

It is shown in:

FIG. 1 a view from at an angle from above onto a vehicle body structure in the left (Withdrawn) of a occupant compartment;

FIG. 2 the vehicle body structure according to FIG. 1 in a view from the bottom.

DETAILED DESCRIPTION OF PREFERRED EMBODIMENTS

Figure 3:
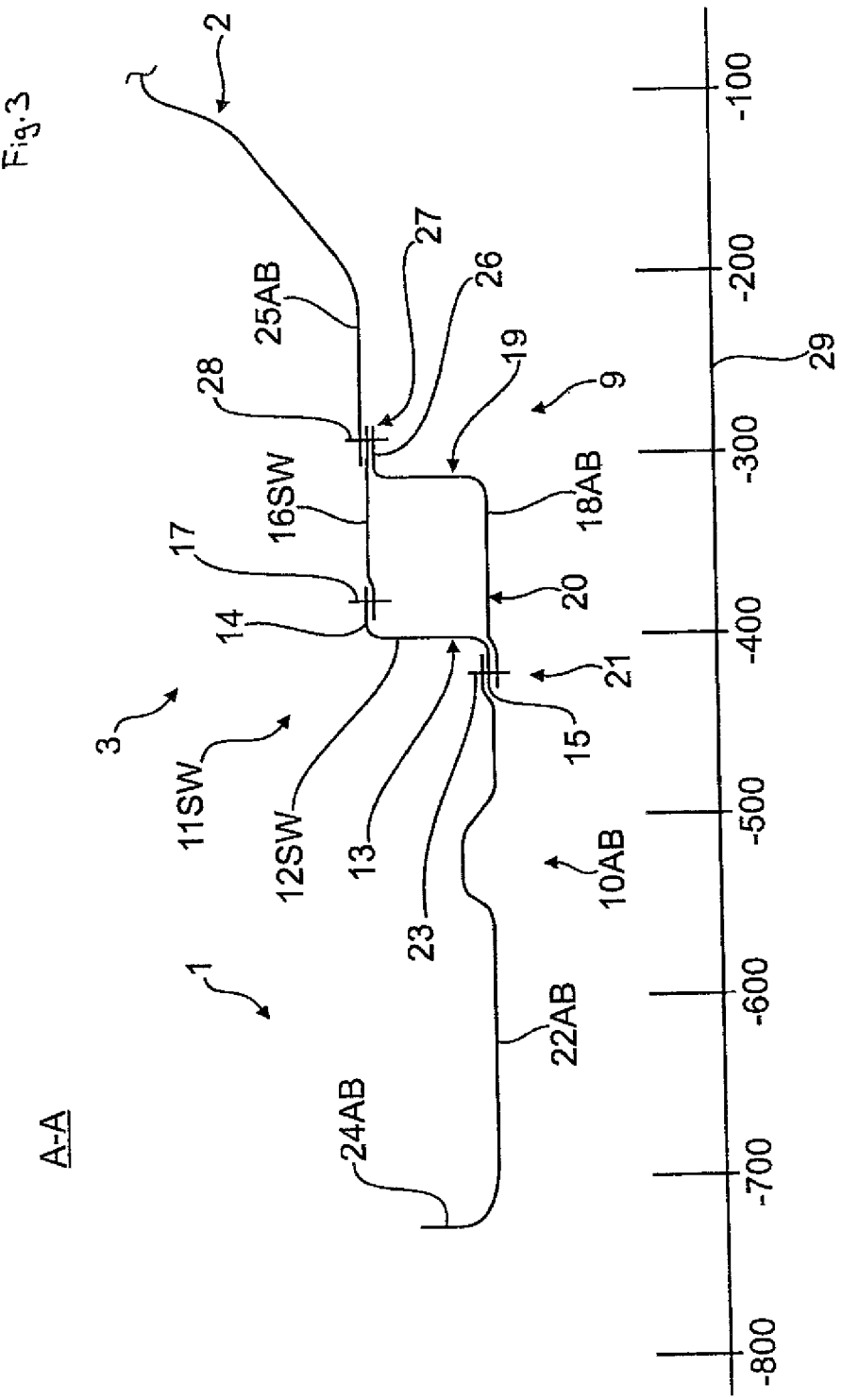
FIG. 3 a schematic sectional representation along the Line A-A from FIG. 1.

FIGS. 1 and 2 show a vehicle body structure 1 of the floor region of a occupant compartment, in the left area of a transmission tunnel 2 cut longitudinally along the center of the vehicle. In the floor region, a longitudinal beam 3 which extends longitudinally and continuously over the entire length of the footwell from the front end 4 of the vehicle up to a heel plate 5AB is disposed between the transmission tunnel and a side sill which is not shown here. Adjoining the longitudinal beam 3 toward the front is a vehicle front end beam 6AP as aluminum profile. In the front footwell region the vehicle front end beam AP and the longitudinal beam 3 are supported by and fastened to a floor-front aluminum casting 7AG which has receiving contours and extends towards the front and top in a trough shape.

The indices used in conjunction with the numerical signs have the following meaning:

| SW = hot formed steel | AP = aluminum profile |
| AB = Aluminum plate | AG = Aluminum casting |

It can be seen from FIG. 1 in combination with FIG. 3 that the cross section of the longitudinal beam 3 as longitudinal hollow beam is roughly square in the front region following an end wall 8AB and is reduced continuously along its longitudinal course towards the rear to become a rectangular cross section.

The concrete construction is further explained with reference to the schematic sectional representation according to FIG. 3.

On its bottom side the longitudinal beam 3 is formed by a longitudinal beam stepped edge 9 of the floor panel 10AB and on its top side by a longitudinal beam angled profile as longitudinal beam closure part 11SW adjoining the longitudinal beam stepped edge 9, wherein the longitudinal beam closure part 11SW is made from hot-formed steel with varying wall thicknesses. The floor panel 10AB on the other hand is constructed as aluminum plate part.

In a further concretization, the longitudinal beam closure part 11SW is made of two longitudinal parts, namely a longitudinal beam side closure part 12SW with a first longitudinal beam sidewall 13 and two bent border flanges 14, 15. In addition, the longitudinal beam closure part 11SW is made of a longitudinal beam top closure part 16 SW as ceiling part, which is connected at a lap joint to the border flange 14 of the longitudinal beam side-closure part 12SW by a resistance spot welding connection 17. The floor panel 10AB is also configured multi-piece with an angular sheet section as longitudinal-stepped aluminum plate 18AB, with the second longitudinal beam sidewall 19 and the longitudinal beam floor wall 20. Adjoining the longitudinal beam stepped aluminum plate 18AB laterally outward at a lap joint 21 is a floor-side aluminum plate 22AB, wherein at the lap joint 21, the border flange 15 of the longitudinal beam side closure steel part 12WS lies between the borders of the longitudinal beam stepped aluminum plate 18AB and the floor-side aluminum plate 22, and a connection is realized by means of a solid punch rivet connection 23 in combination with a bonding. The laterally upward bent longitudinal strip 24AB of the floor-side aluminum plate 22 is connected to a side sill (side sill not shown here).

Further, the longitudinal beam level aluminum plate 18AB as a part of the floor panel 10AB, is continued with a floor-middle aluminum plate 25AB which bends upwards toward the longitudinal center and contributes to forming the transmission tunnel 2. An upward bent border flange 26 of the longitudinal beam stepped aluminum plate 18AB and a border of the floor center aluminum plate 25AB overlap one another in a lap joint 27 with a border of the longitudinal beam top closure steel part extending in between, wherein here as well a connection is realized within the wet area by a solid punch rivet connection 28 in combination with a bonding and, optionally, by additional overmolding with sealing material.

To illustrate the lateral dimensions, a scale 29 is provided in FIG. 3, in which the value 0(no longer shown) corresponds to the longitudinal center of the vehicle and the indicated number values are millimeter values in Y-direction towards the left side of the vehicle.

LIST OF REFERENCE SIGNS 1 vehicle body structure
2 middle module
3 longitudinal beam
4 front of the vehicle
5AB heel plate
6AP vehicle front beam
7AG floor-front aluminum casting
8AB end wall
9 longitudinal beam stepped edge
10AB floor panel
11SW longitudinal beam closure part
12SW longitudinal beam side closure steel part
13 first longitudinal beam sidewall
14 border flange
15 border flange
16SW longitudinal beam top closure steel part
17 resistance spot welding connection
18AB longitudinal beam stepped aluminum plate
19 second longitudinal beam sidewall
20 longitudinal beam floor wall
21 lap joint
22AB floor-side aluminum plate
23 solid punch rivet connection
24AB longitudinal strip
25 floor-middle aluminum plate
26 border flange
27 lap joint
28 solid punch rivet connection
29 scale

The invention claimed is:

1. A vehicle body structure in a floor region of a passenger compartment comprising a hollow longitudinal beam having a topside, a bottom side and side walls and extending in the floor region between a transmission tunnel and a side sill on either side of the passenger compartment longitudinally continuously over an entire length of a footwell from a front end to a heel plate, wherein the bottom side and one of the side walls are formed by a stepped edge of a floor panel, and the top side and another one of the side walls are formed by a closure part configured as an angled section and connected to the floor panel.

2. The vehicle body structure of claim 1, wherein the floor panel is an aluminum plate and the closure part is a steel closure part made from hot-formed steel, wherein the floor panel and the closure part are connected by rivets at lap joints formed between the floor panel and the closure part.

3. The vehicle body structure of claim 2, wherein the rivets are solid punch rivets.

4. The vehicle body structure of claim 1, wherein the closure part is made from two longitudinal parts, one of the two longitudinal parts forming said other side wall and having bent border flanges so that the one of the two longitudinal parts has a Z-shaped cross section, and the other one of the longitudinal parts including an approximately level top closure steel part as cover part forming said topside, said two longitudinal parts being connected at a lap joint and at one of the border flanges by a welding process.

5. The vehicle body structure of claim 4, wherein the welding process includes resistance spot welding.

6. The vehicle body structure of claim 1, wherein the floor panel is made of several parts and includes a stepped aluminum plate forming said stepped edge, said stepped aluminum plate having longitudinal borders forming lap joints with longitudinal borders of the closure part as well as with an adjoining floor side aluminum plate and with an adjoining floor middle aluminum plate, said lap joints being connected by rivets, with a steel plate border of the closure part lying between the borders of the aluminum plate.

7. The vehicle body structure of claim 6, wherein the lap joints are connected in a wet area by full punch riveting in combination with a bonding.

8. The vehicle body structure of claim 1, wherein the longitudinal beam has a cross section which is relatively large in a front region and roughly square and which has a height which decreases continuously in a longitudinal direction so that the cross section in a back area has a configuration in the shape of a flat rectangle.

9. A method for manufacturing the vehicle body structure of claim 1, comprising:
   connecting a the floor panel with the closure part to form at least partly a composite part and a pre-assembly module; and
   using the composite and pre-assembly module in a final assembly.

10. The method of claim 9, wherein the floor panel is an aluminum plate and the closure part is a steel closure part made from hot-formed steel, wherein the floor panel and the closure part are connected by rivets at lap joints formed between the floor panel and the closure part.

11. The method of claim 10, wherein the rivets are solid punch rivets.

12. The method of claim 9, wherein the closure part is made from two longitudinal parts, one of the two longitudinal parts forming said other side wall and having bent border flanges so that the one of the two longitudinal parts has a Z-shaped cross section, and the other one of the longitudinal parts including an approximately level top closure steel part as cover part forming said topside, said two longitudinal parts being connected at a lap joint and at one of the border flanges by a welding process.

13. The method of claim 12, wherein the welding process includes resistance spot welding.

14. The method of claim 9, wherein the floor panel is made of several parts and includes a stepped aluminum plate forming said stepped edge, said stepped aluminum plate having longitudinal borders forming lap joints with longitudinal borders of the closure part as well as with an adjoining floor side aluminum plate and with an adjoining floor middle aluminum plate, said lap joints being connected by rivets, with a steel plate border of the closure part lying between the borders of the aluminum plate.

15. The method of claim 14, wherein the lap joints are connected in a wet area by full punch riveting in combination with a bonding.

* * * * *

UNITED STATES PATENT AND TRADEMARK OFFICE
CERTIFICATE OF CORRECTION

Page 1 of 1

PATENT NO. : 8,720,980 B2
APPLICATION NO. : 13/496166
DATED : May 13, 2014
INVENTOR(S) : Willibald Weigl et al.

It is certified that error appears in the above-identified patent and that said Letters Patent is hereby corrected as shown below:

In the Claims

In column 6, claim 9, line 6: please delete "a" after --connecting--.

Signed and Sealed this
Seventh Day of October, 2014

Michelle K. Lee
*Deputy Director of the United States Patent and Trademark Office*